United States Patent
Lee et al.

(10) Patent No.: US 10,856,645 B2
(45) Date of Patent: Dec. 8, 2020

(54) INTERDENTAL BRUSH BENDABLE WITHIN ORAL CAVITY

(71) Applicants: Sang Geun Lee, Gwangju-si (KR); Chaeeun Lee, Gwangju-si (KR); Jiah Lee, Gwangju-si (KR)

(72) Inventors: Sang Geun Lee, Gwangju-si (KR); Chaeeun Lee, Gwangju-si (KR); Jiah Lee, Gwangju-si (KR)

( * ) Notice: Subject to any disclaimer, the term of this patent is extended or adjusted under 35 U.S.C. 154(b) by 0 days.

(21) Appl. No.: 16/423,280

(22) Filed: May 28, 2019

(65) Prior Publication Data

US 2020/0323333 A1    Oct. 15, 2020

(30) Foreign Application Priority Data

Apr. 15, 2019    (KR) .................. 10-2019-0043667

(51) Int. Cl.
*A46B 5/00* (2006.01)
*A46B 11/00* (2006.01)
*A61C 15/00* (2006.01)

(52) U.S. Cl.
CPC .......... *A46B 5/0083* (2013.01); *A46B 5/0025* (2013.01); *A46B 5/0066* (2013.01); *A46B 11/0089* (2013.01); *A61C 15/00* (2013.01); *A46B 5/002* (2013.01); *A46B 5/0033* (2013.01); *A46B 11/002* (2013.01); *A46B 11/0041* (2013.01); *A46B 2200/108* (2013.01)

(58) Field of Classification Search
CPC ... A46B 5/0083; A46B 5/0025; A46B 5/0066; A46B 11/0006; A46B 11/0089; A46B 11/002; A46B 2200/108; A46B 11/001; A46B 11/0041; A46B 11/0072; A46B 5/00; A46B 5/0062; A61C 15/00; A61C 15/046; A61C 15/048
See application file for complete search history.

(56) References Cited

U.S. PATENT DOCUMENTS

| | | | | |
|---|---|---|---|---|
| 5,001,803 A | * | 3/1991 | Discko, Jr. ............... | A61C 5/60 15/167.1 |
| 5,150,495 A | * | 9/1992 | Discko, Jr. ........... | A46B 5/0075 15/106 |
| 5,425,591 A | * | 6/1995 | Contreras .......... | A46B 11/0006 132/308 |
| 6,132,126 A | * | 10/2000 | Sheffler .................. | A45D 34/04 401/209 |
| 6,530,707 B1 | * | 3/2003 | Byrne .................... | A45D 34/04 401/176 |
| 6,957,958 B2 | * | 10/2005 | Rowe ...................... | A61C 5/60 206/209 |
| 2002/0066151 A1 | * | 6/2002 | Parker .................. | A46B 5/0079 15/172 |

FOREIGN PATENT DOCUMENTS

| | | |
|---|---|---|
| CN | 204293290 U | 4/2015 |
| DE | 19522502 A1 | 2/1996 |
| KR | 10-1688366 B1 | 12/2016 |

* cited by examiner

*Primary Examiner* — David J Walczak
(74) *Attorney, Agent, or Firm* — KORUS Patent, LLC; Seong Il Jones

(57) ABSTRACT

A convenient interdental brush is provided in which a bendable bellows structure similar to the corrugated portion of a straw is implemented in the interdental brush, thereby enabling the direction of bristles to be freely changed within the oral cavity.

5 Claims, 4 Drawing Sheets

INTERDENTAL BRUSH BENDABLE WITHIN ORAL CAVITY

CROSS-REFERENCE TO RELATED APPLICATION

This application claims the benefit of Korean Patent Application No. 10-2019-0043667 filed on Apr. 15, 2019, which is hereby incorporated by reference herein in its entirety.

BACKGROUND

1. Technical Field

The present invention relates to an interdental brush that is bendable within the oral cavity.

2. Description of the Related Art

The present applicant has obtained related rights while developing interdental brushes through eight patent rights, including Korean Utility Model Registration No. 20-465554, Korean Patent No. 10-1500288, Korean Patent No. 10-1493646, Korean Patent No. 10-1645283, etc., and corresponding overseas patents, and the products manufactured based on them have been relatively favorably received by the market.

However, each of the conventional interdental brushes causes the inconvenience of changing the inclination or direction of the overall interdental brush by moving a hand in order to change the direction of the interdental brush after inserting the interdental brush into the mouth because an overall structure including a body is made of a hard material. Furthermore, in order to uniformly brush the fine portions and three-dimensional surfaces of the teeth, it has been found that it is efficient that at least the upper portion of the interdental brush including bristles is flexibly bent and the direction of the interdental brush is freely changed at least in the oral cavity.

The present invention has been conceived based on the above findings.

SUMMARY

An object of the present invention is to provide an interdental brush that enables a cleaning direction to be freely changed within the oral cavity in such a manner that the upper portion of the interdental brush including bristles is flexibly bent.

In order to accomplish the above object, the present invention provides an interdental brush including: a streamlined container, a storage portion disposed inside the container and configured to store a cleaning fluid, and bristles adapted to protrude from the container to the outside and configured to receive the cleaning fluid from the storage portion and to supply the cleaning fluid to the oral cavity of a user; wherein the interdental brush includes a bendable portion made of a soft material so that the cleaning direction of the bristles is changed, the container excluding the bendable portion is made of a hard material, and the bendable portion is disposed at a location which does not interfere with the storage portion inside the container and is fabricated in a corrugated structure so that the bendable portion is not fatigued with repeated bending.

The container may include an upper portion, a flange configured such that a cover is coupled thereto, and a streamlined elongated body sequentially from the top of the container, and the bendable portion may be disposed between the flange and the body.

The container may include an upper portion, a flange configured such that a cover is coupled thereto, and a streamlined elongated body sequentially from the top of the container, the upper portion may be sealed with a thin streamlined small cap, and the small cap may be formed as the bendable portion.

The container may be divided into an upper body and a long lower body disposed below the upper body, and the bendable portion may be disposed between the lower body and the upper body, so that the direction of the bristles is changed in such a manner that force is applied to the upper body by the thumb and the lower body is gripped with the remaining fingers.

The container may be divided into an upper body and a long lower body disposed below the upper body, and the bendable portion may be disposed above the lower body, so that the direction of the bristles is changed in a far inner portion of the oral cavity.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings so that those having ordinary knowledge in the art to which the present invention pertains can easily practice the present invention. However, the present invention may be implemented in various different forms, and is not limited to the embodiments described herein.

The gist of the present invention is to fabricate a portable interdental brush from a composite material having a bendable portion.

Figure 1:
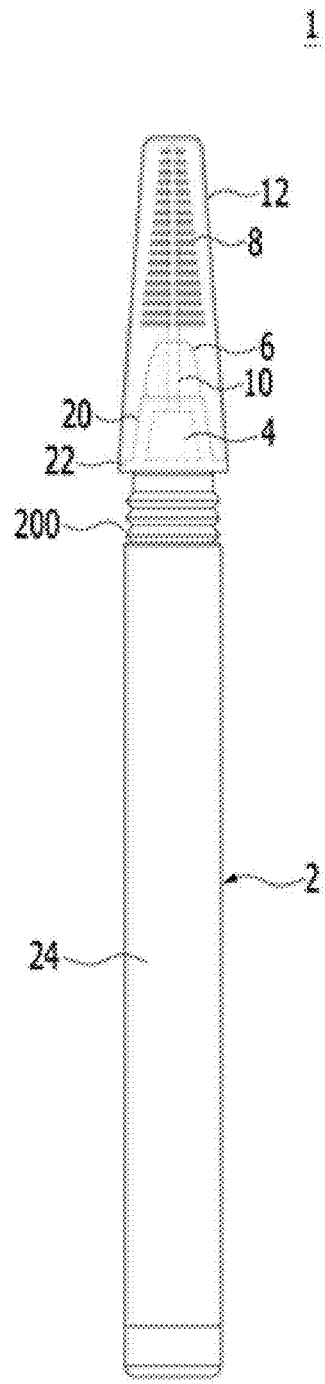
FIG. 1 is a front view showing a bendable interdental brush according to a first embodiment of the present invention.

FIG. 1 is a view showing a bendable interdental brush 1 according to a first embodiment of the present invention.

The interdental brush 1 includes a streamlined container 2. The container 2 includes an upper portion 20, a flange 22, a bendable portion 200, and a streamlined elongated body 24 sequentially from the top thereof. A cover 12 is mounted on the outer circumference of the flange 22. A storage portion 4 is located inside the upper portion 20 of the container 2, as shown in the drawing, and a cleaning fluid, which is a toothpaste component for tooth brushing, is stored in the storage portion 4. The upper portion 20 is sealed with a thin small streamlined cap 6. Bristles 8 are formed on the upper portion of a thin steel core-shaped shaft 10. The lower end of the shaft 10 passes through the cap 6, and extends into the storage portion 4. When a user presses the window panel (not shown) of the body 24 with a hand or tilts the container 2, the cleaning fluid contained in the storage portion 4 flows through the shaft 10, and is supplied to the bristles 8.

In the interdental brush 1 according to the present invention, a bendable portion 200 is formed between the lower end of the flange 22 to which the cover 12 is coupled and the body 24. It is preferable that the location where the bendable portion 200 is disposed does not overlap the storage portion 4 and the interdental brush 1 is sufficiently bent within the oral cavity such that the directions in which the cleaning fluid is discharged and cleaning is performed can be freely changed. In other words, the interdental brush 1 does not need to be bent outside the oral cavity or in the excessively deep inner portion of the oral cavity.

The container 2 and the cap 6 excluding the bendable portion 200 of the present invention are made of a hard rigid material, and the bendable portion 200 is made of a flexible soft material. The bendable portion 200 needs to have sufficiently high elasticity so that it can be bent in any direction. The bendable portion 200 may be made of plastic synthetic resin, such as polystyrene, or silicone. The bendable portion 200 is preferably formed in a corrugated structure, a so-called "bellows" structure, which is similar to the bending portion of a straw. In this case, there is no crack or breakage in spite of repeated bending, and a permanent use period without fatigue may be expected.

Figure 2:
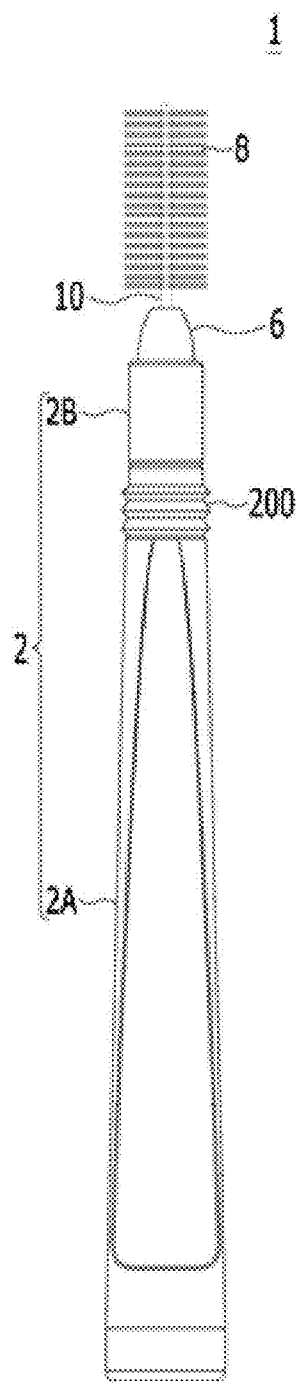
FIG. 2 is a front view showing a bendable interdental brush according to a second embodiment of the present invention.

FIG. 2 is a view showing a bendable interdental brush 1 according to a second embodiment of the present invention, in which the same reference symbols are assigned to the portions that are the same as those of the first embodiment.

The second embodiment is different from the first embodiment in that bristles 8 are arranged in a thin rectangular shape, a container 2 is divided into a lower body 2A having a long length and an upper body 2B having a short length, and a bendable portion 200 is formed between the lower body 2A and the upper body 2B. The bendable portion 200 preferably has a corrugated structure. The second embodiment has the advantage of providing the convenience of use because the direction of the bristles 8 may be changed in such a manner that force is applied to the upper body 2B by the thumb and the lower body 2A is gripped by the remaining fingers.

Figure 3:
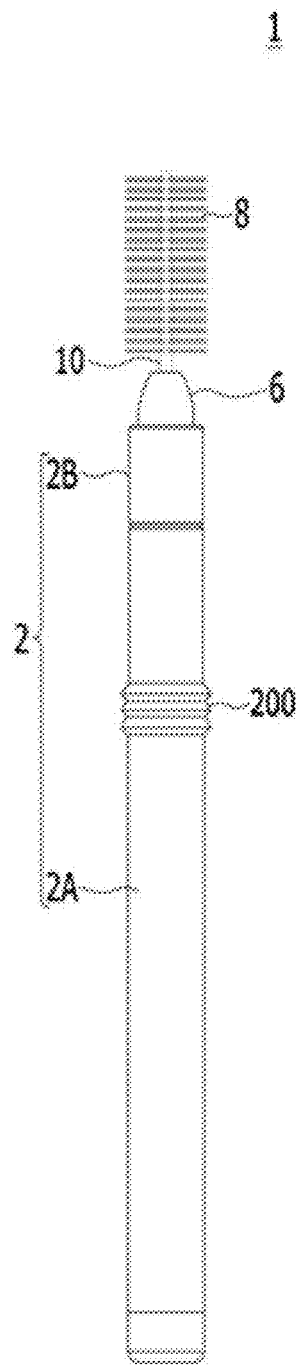
FIG. 3 is a front view showing a bendable interdental brush according to a third embodiment of the present invention.

FIG. 3 is a view showing a bendable interdental brush 1 according to a third embodiment of the present invention. The third embodiment is different from the second embodiment in that a bendable portion 200 is formed in the upper portion of a lower body 2A. In this case, the interdental brush 1 is advantageous for cleaning a far inner portion of the oral cavity.

Figure 4:
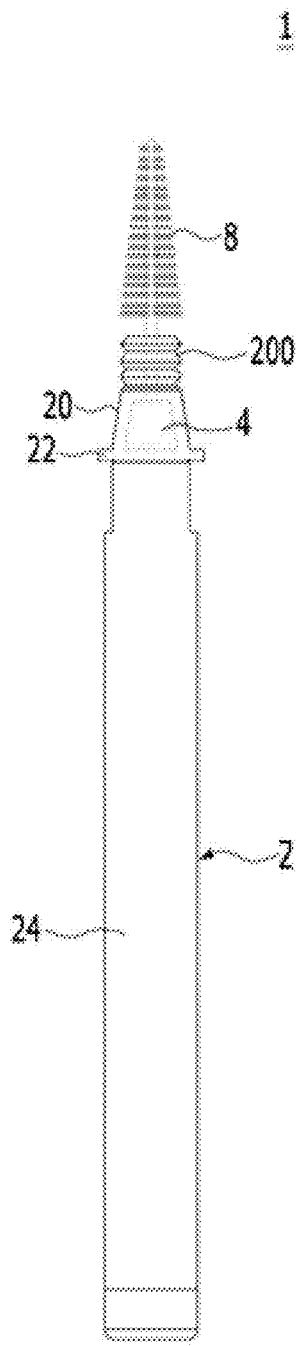
FIG. 4 is a front view showing a bendable interdental brush according to a fourth embodiment of the present invention.

FIG. 4 is a view showing a bendable interdental brush 1 according to a fourth embodiment of the present invention. Although the fourth embodiment has a structure similar to that of the first embodiment, the fourth embodiment is different from the first embodiment in that the cap 6 of the first embodiment has been replaced with a bendable portion 200. In this case, the interdental brush 1 has the advantage of being advantageous for, in particular, performing short-distance fine cleaning because the direction of bristles 8 may be changed using an upper portion 20 as a lever in the state of having brought the upper portion 20 into contact with teeth or lips.

The present invention has the effect of providing the interdental brush having a bendable portion, which is freely bent within the oral cavity to thus facilitate cleaning and which is not fatigued with repeated bending.

Although the preferred embodiments of the present invention have been described above, the embodiments are merely examples, and the scope of the present invention includes not only the described embodiments but also various modifications. The gist of the present invention is to fabricate the portable interdental brush from a composite material having a bendable portion. The present invention may be implemented as various embodiments, and the scope of the present invention encompasses ranges that are identical or equivalent to the attached claims.

What is claimed is:

1. An interdental brush comprising:
   a streamlined container,
   a storage portion disposed inside the container and configured to store a cleaning fluid,
   a shaft protruded from the container to an outside, a lower end of the shaft extending into the storage portion, and
   bristles formed on an upper portion of the shaft and configured to receive the cleaning fluid from the storage portion through the shaft and to supply the cleaning fluid to an oral cavity of a user;
   wherein the interdental brush includes a bendable portion made of a soft material so that a cleaning direction of the bristles is changed, the container excluding the bendable portion is made of a hard material, and the bendable portion is disposed at a location which does not overlap the storage portion inside the container and is fabricated in a corrugated structure so that the bendable portion is not fatigued with repeated bending.

2. The interdental brush of claim 1, wherein the container includes an upper portion, a flange configured such that a cover is coupled thereto, and a streamlined elongated body sequentially from a top of the container, and the bendable portion is disposed between the flange and the body.

3. The interdental brush of claim 1, wherein the container includes an upper portion, a flange configured such that a cover is coupled thereto, and a streamlined elongated body sequentially from a top of the container, the upper portion is sealed with a thin streamlined small cap, and the small cap is formed as the bendable portion.

4. The interdental brush of claim 1, wherein the container is divided into an upper body and a long lower body disposed below the upper body, and the bendable portion is disposed between the lower body and the upper body, so that the direction of the bristles is changed in such a manner that force is applied to the upper body by a thumb and the lower body is gripped with remaining fingers.

5. The interdental brush of claim 1, wherein the container is divided into an upper body and a long lower body disposed below the upper body, and the bendable portion is disposed in an upper portion of the lower body, so that the direction of the bristles is changed in a far inner portion of the oral cavity.

* * * * *